United States Patent
Tanaka et al.

(10) Patent No.: US 6,488,607 B1
(45) Date of Patent: Dec. 3, 2002

(54) TOROIDAL TYPE CONTINUOUSLY VARIABLE TRANSMISSION

(75) Inventors: Hirohisa Tanaka, Tokyo (JP); Takashi Imanishi, Yokohama (JP); Hisashi Machida, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/613,578

(22) Filed: Jul. 11, 2000

(30) Foreign Application Priority Data

Jul. 12, 1999 (JP) .............................. 11-197775

(51) Int. Cl.$^7$ .............................................. F16H 15/38
(52) U.S. Cl. .............................. 476/2; 476/10; 476/40
(58) Field of Search ................................ 476/2, 10, 40, 476/41, 42

(56) References Cited

U.S. PATENT DOCUMENTS

| | | | | |
|---|---|---|---|---|
| 4,434,675 A | * | 3/1984 | Kraus | 476/10 |
| 4,718,294 A | * | 1/1988 | Okoshi | 476/10 |
| 5,048,359 A | * | 9/1991 | Nakano | 476/10 |
| 5,980,421 A | * | 11/1999 | Machida et al. | 476/10 |
| 6,077,185 A | * | 6/2000 | Kobayashi | 476/10 |

FOREIGN PATENT DOCUMENTS

| | | |
|---|---|---|
| JP | 62-71465 | 5/1987 |
| JP | 1-173552 | 12/1989 |
| JP | 5-39850 | 2/1993 |
| JP | 5-296324 | 11/1993 |
| JP | 2568684 | 10/1996 |
| JP | 10-299852 | 11/1998 |

* cited by examiner

Primary Examiner—William C Joyce
(74) Attorney, Agent, or Firm—Miles & Stockbridge P.C.

(57) ABSTRACT

In order to stabilize an operation for changing a speed change ratio, and to improve transmitting efficiency and endurance of structural parts of a toroidal continuously variable transmission, a relationship between the switching of a control valve and displacements of trunnions is such that initiation of the displacement of a trunnion having a feedback mechanism including a precess cam and a link arm is effected prior to initiation of the displacement of a trunnion not having a feedback mechanism.

27 Claims, 8 Drawing Sheets

TOROIDAL TYPE CONTINUOUSLY VARIABLE TRANSMISSION

BACKGROUND OF THE INVENTION

1. Field of the Invention

The present invention relates to a toroidal type continuously variable transmission used as a speed changing unit constituting an automatic transmission of a vehicle. Particularly, the present invention aims to achieve excellent transmitting efficiency and durability by synchronizing various power transmitting portions with each other when a quick speed changing operation is effected.

2. Related Background Art

Figure 1:
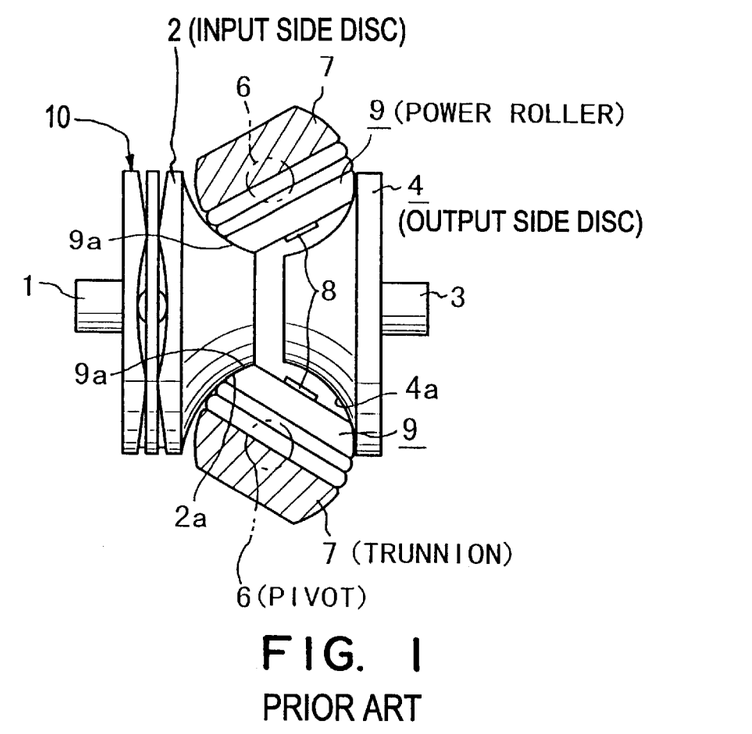
FIG. 1 is a schematic side view of a fundamental construction of a toroidal type continuously variable transmission in a maximum speed reduction condition.
Figure 2:
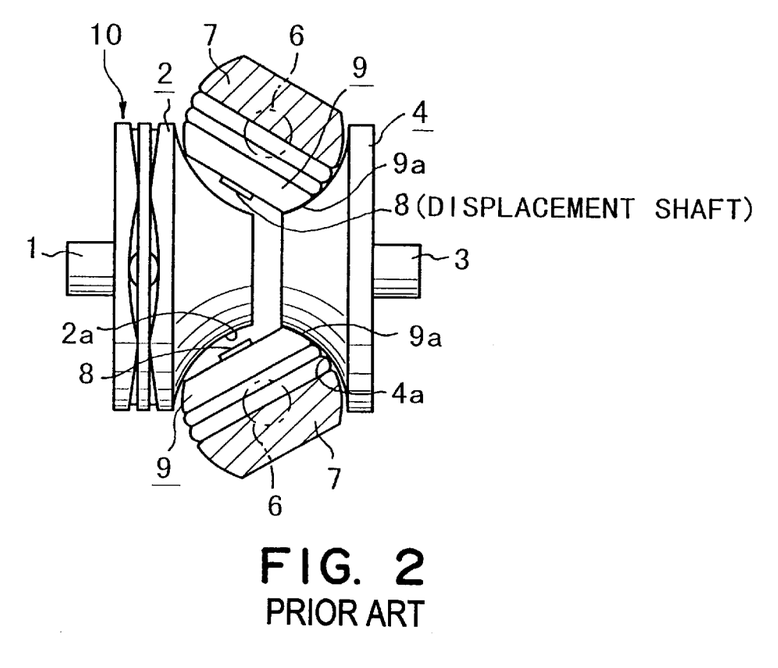
FIG. 2 is a schematic side view of the fundamental construction of the toroidal type continuously variable transmission in a maximum speed increase condition.

As an automatic transmission of a motor vehicle, usage of a toroidal type continuously variable transmission as schematically shown in FIGS. 1 and 2 has been investigated. For example, as disclosed in Japanese Utility Model Application Laid-Open No. 62-71465, in the toroidal type continuously variable transmission, an input side disc 2 is supported coaxially with an input shaft 1, and an output side disc 4 is secured to an end of an output shaft 3 disposed coaxially with the input shaft 1. Within a casing 5 (refer to FIG. 4 which will described later) containing the toroidal type continuously variable transmission, trunnions 7 pivoted around pivot shafts 6 arranged positions twisted with respect to the input shaft 1 and the output shaft 3.

Each trunnion 7 is provided at its outer surface (on both ends thereof) with a pair of coaxial pivot shafts 6. Central axes of the pivot shafts 6 do not intersect with the central axis of the discs 2, 4 but are located at twisted positions perpendicular to the central axis of the discs 2, 4. Further, each trunnion 7 supports a proximal half portion of a displacement shaft 8 so that an inclined angle of the displacement shaft 8 can be adjusted by rocking the trunnion 7 around the pivot shafts 6. Around a distal half portion of the displacement shaft 8 supported by each trunnion 7, a power roller 9 is rotatably supported. The power rollers 9 are disposed between inner surfaces 2a, 4a of the input and output side discs 2, 4.

The opposed inner surfaces 2a, 4a of the input and output side discs 2, 4 have concave surfaces of arcuate section obtained by rotating arcs or similar curves around the input and output shafts. Peripheral surfaces 9a of the power rollers 9 are spherical convex surfaces that abut against the inner surfaces 2a, 4a. Further, an urging device 10 such as a loading cam is disposed between the input shaft 1 and the input side disc 2, so that the input side disc 2 can be rotated while elastically urging it toward the output side disc 4 by the urging device 10.

When the toroidal type continuously variable transmission having the above-mentioned construction is used, as the input shaft 1 is rotated, the urging device 10 rotates the input side disc 2 while urging it against the plural power rollers 9. Rotation of the input side disc 2 is transmitted to the output side disc 4 via the plural power rollers 9, thereby rotating the output shaft 3 secured to the output side disc 4.

When a rotational speed ratio (transmission ratio) between the input shaft 1 and the output shaft 3 is changed, and particularly when the speed reduction is effected between the input shaft 1 and the output shaft 3, the trunnions 7 are rocked around the pivot shafts 6 to incline the displacement shafts 8 so that, as shown in FIG. 1, the peripheral surfaces 9a of the power rollers 9 abut against portions of the inner surface 2a of the input side disc 2 near the center thereof and portions of the inner surface 4a of the output side disc 4 near the outer periphery thereof.

Conversely, when the speed increase is effected, the trunnions 7 are rocked to incline the displacement shafts 8 so that, as shown in FIG. 2, the peripheral surfaces 9a of the power rollers 9 abut against portions of the inner surface 2a of the input side disc 2 near the outer periphery thereof and portions of the inner surface 4a of the output side disc 4 near the center thereof. When the inclined angles of the displacement shafts 8 are selected to an intermediate values between FIG. 1 and FIG. 2, an intermediate speed ratio can be obtained.

Figure 3:
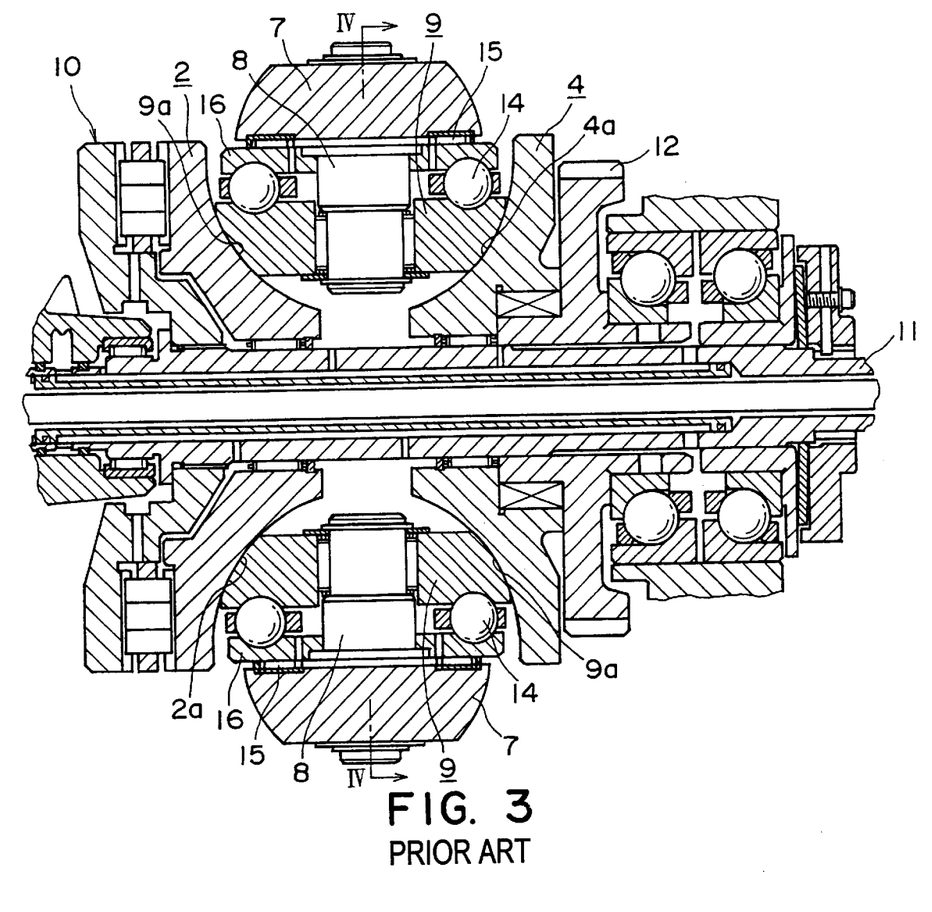
FIG. 3 is a partial sectional view showing a first example of a specific construction of the toroidal type continuously variable transmission.
Figure 4:
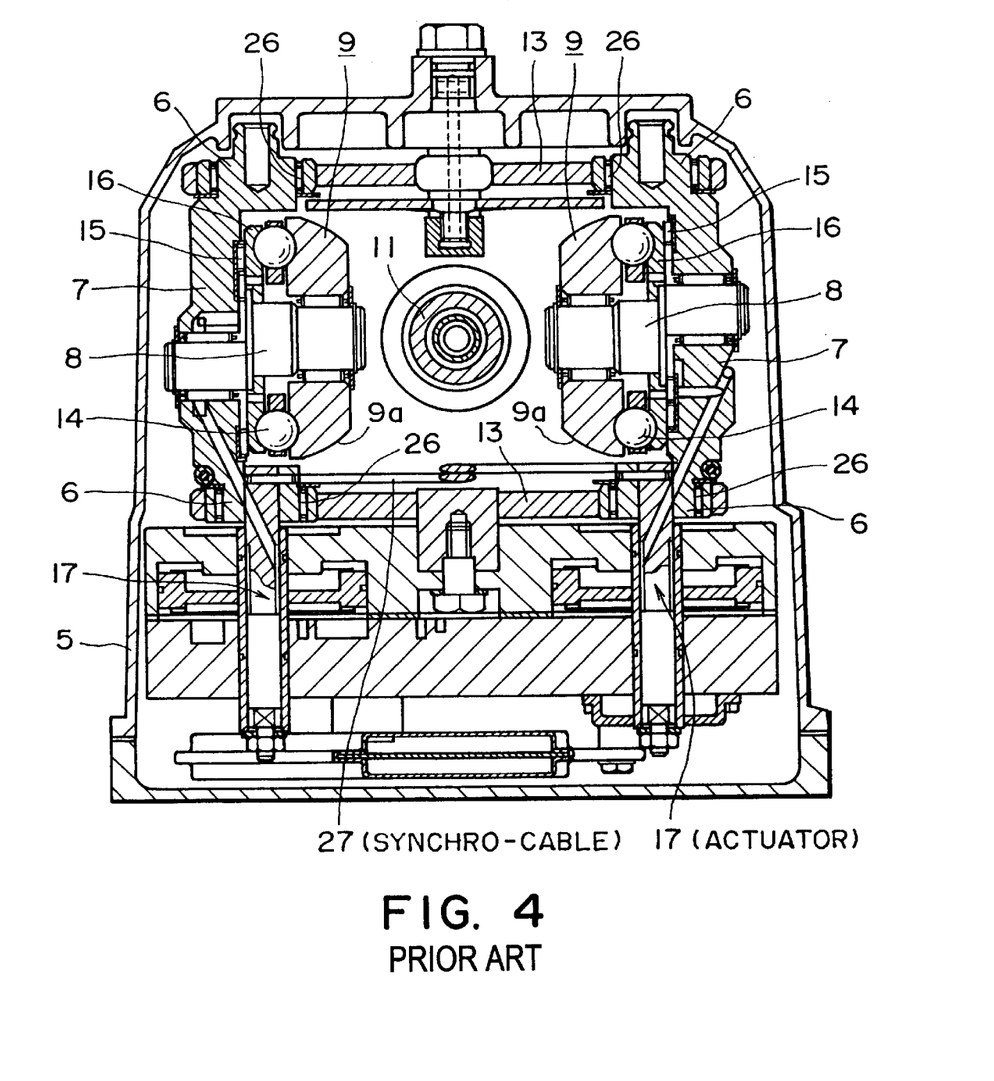
FIG. 4 is a sectional view taken along the line IV—IV in FIG. 3.

FIGS. 3 and 4 show in more detail a toroidal type continuously variable transmission as disclosed in Japanese Utility Model Application No. 63-69293 (Japanese Utility Model Application Laid-Open No. 1-173552). An input side disc 2 and an output side disc 4 are rotatably supported around a cylindrical tubular input shaft 11. Further, an urging device 10 is disposed between an end of the input shaft 11 and the input side disc 2. On the other hand, an output gear 12 is connected to the output side disc 4 so that they are rotated in sychronism with each other.

Coaxial pivot shafts 6 provided on both ends of a pair of trunnions 7 are supported by a pair of support plates (yokes) 13 for rocking movement and axial movement (movement perpendicular to the plane of FIG. 3; movement in an up-and-down direction in FIG. 4). The trunnions 7 support proximal half portions of displacement shafts 8 at their intermediate portions. In each displacement shaft 8, the proximal half portion and a distal half portion are eccentric from each other. The proximal half portions are rotatably supported by the intermediate portions of the trunnions 7, and power rollers 9 are rotatably supported by the distal half portions. Further, a synchro-cable 27 is mounted between the ends of the trunnions 7 with cross belting so that inclined angles of the trunnions can be synchronized mechanically.

The pair of displacement shafts 8 are diametrically opposed with respect to the input shaft 11. Further, the eccentric directions of the proximal half portions and the distal half portions of the displacement shafts 8 are the same (opposite directions vertically in FIG. 4) with respect to the rotational directions of the input and output side discs 2, 4. Further, the eccentric directions are substantially perpendicular to the installation direction of the input shaft 11. Accordingly, the power rollers 9 are supported for slight movement in the installation direction of the input shaft 11.

Further, between the outer peripheral surfaces of the power rollers 9 and intermediate portions of the inner surfaces of the trunnions 7, there are disposed, in order from the power rollers 9, thrust ball bearings 14 and thrust needle bearings 15. The thrust ball bearings 14 serve to support thrust loads acting on the power rollers 9 and to permit rotations of the power rollers 9. Further, the thrust needle bearings 15 serve to support thrust loads applied from the power rollers 9 to outer races 16 of the thrust ball beatings 14 and to permit the distal half portions of the displacement shafts 8 and the outer races 16 to rock around the proximal half portions of the displacement shafts 8. Further, the trunnions 7 can be shifted along axial directions of the pivot shafts 6 by means of hydraulic actuators (for example, hydraulic cylinders) 17.

In case of the toroidal type continuously variable transmission having the above-mentioned construction, the rotation of the input shaft 11 is transmitted to the input side disc 2 via the urging device 10. The rotation of the input side disc 2 is transmitted to the output side disc 4 via the pair of power rollers 9, and the rotation of the output side disc 4 is picked up by the output gear 12.

When a rotational speed ratio between the input shaft 11 and the output gear 12 is changed, the pair of trunnions 7 are displaced by the actuators 17 in opposite directions (for example, the right power roller 9 in FIG. 4 is displaced downwardly and the left power roller 9 in FIG. 4 is displaced upwardly). As a result, directions of tangential forces acting between the peripheral surfaces 9a of the power rollers 9 and the inner surfaces 2a, 4a of the input and output side discs 2, 4 are changed. As such directions are changed, the trunnions 7 are rocked in opposite directions around the pivot shafts 6 pivotally supported by the support plates 13. As a result, as shown in FIGS. 1 and 2, abutment positions between the peripheral surfaces 9a of the power rollers 9 and the inner surfaces 2a, 4a are changed, thereby changing the rotational speed ratio between the input shaft 11 and the output gear 12.

Figure 6:
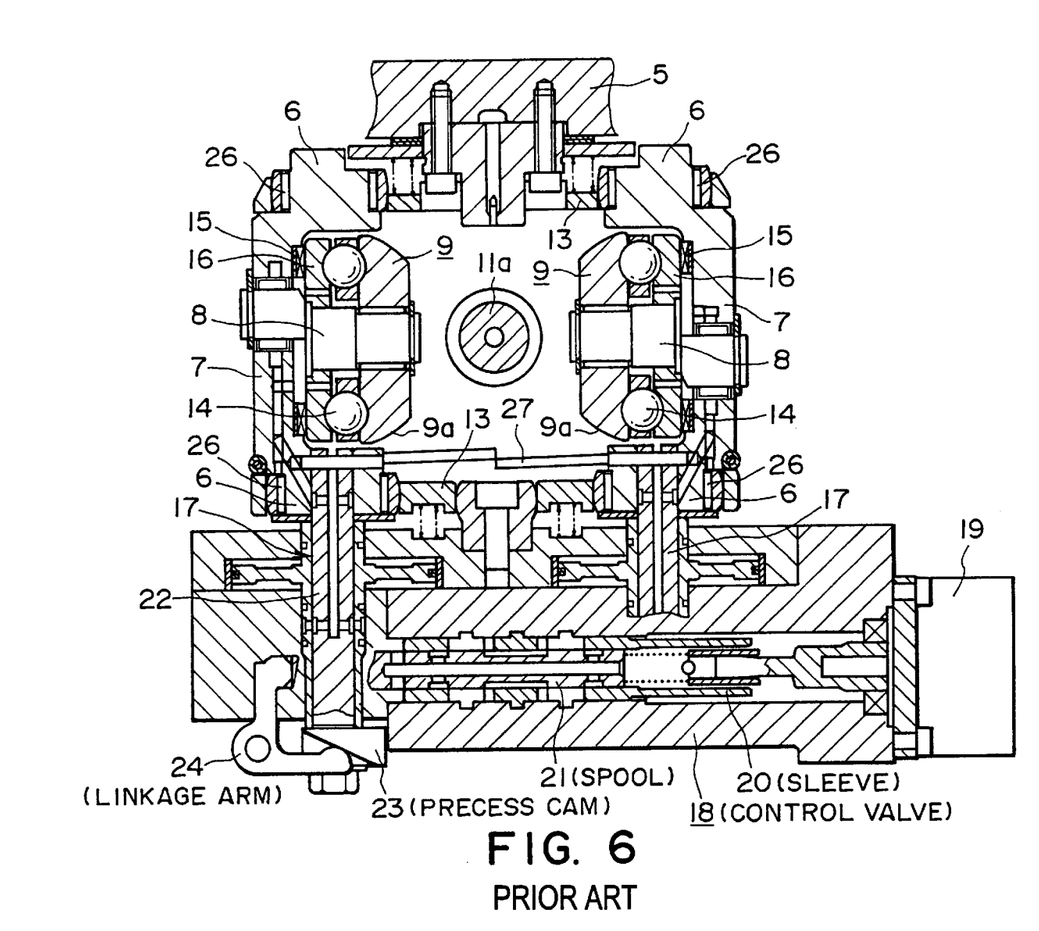
FIG. 6 is a sectional view taken along the line VI—VI in FIG. 5.

The supplying of pressurized oil to the actuators 17 is effected by a single control valve regardless of the number of actuators 17, and movement of either one of the trunnions 7 is fed-back to the control valve. Such arrangement will be described with reference to FIG. 6 showing a second example of a conventional construction. The control valve 18 includes a sleeve 20 displaced axially (left-and-right direction in FIG. 6) by means of a stepping motor 19, and a spool 21 fitted into the sleeve 20 for axial movement. A precess cam 23 is secured to an end of a rod 22 of the trunnion 7 (either one of the trunnions), thereby providing a feedback mechanism in which movement of the rod 22 is transmitted to the spool 21 via the precess cam 23 and a link arm 24.

When the transmitting condition is switched, the sleeve 20 is displaced by a predetermined amount by means of the stepping motor 19, thereby opening a flow path of the control valve 18. Consequently, the pressurized oil is supplied to the actuators 17 from predetermined directions, with the result that the trunnions 7 are displaced in predetermined directions by the actuators 17. In this way, the movement of either one of the trunnions 7 is transmitted to the spool 21 via the precess cam 23 secured to the end of the rod 22 and the link arm 24, thereby displacing the spool 21 axially. As a result, in a condition that the trunnions 7 are displaced by the predetermined amounts, the flow path of the control valve 18 is closed, thereby stopping the supplying of the pressurized oil to the actuators 17. Accordingly, the axial displacement amounts of the trunnions 7 correspond to the displacement amount of the sleeve 20 caused by the stepping motor 19.

When the power is transmitted by the toroidal type continuously variable transmission, in accordance with elastic deformation of structural elements, the power rollers 9 are displaced in the axial direction of the input shaft 11. And, the displacement shafts 8 supporting the power rollers 9 are slightly rotated around the respective proximal half portions. As a result, outer surface of the outer races 16 of the thrust ball bearings 14 and the inner surfaces of the trunnions 7 are displaced relative to each other. Since the thrust needle bearings are disposed between the outer surfaces and the inner surfaces, a force required for effecting such relative displacement is small.

Figure 5:
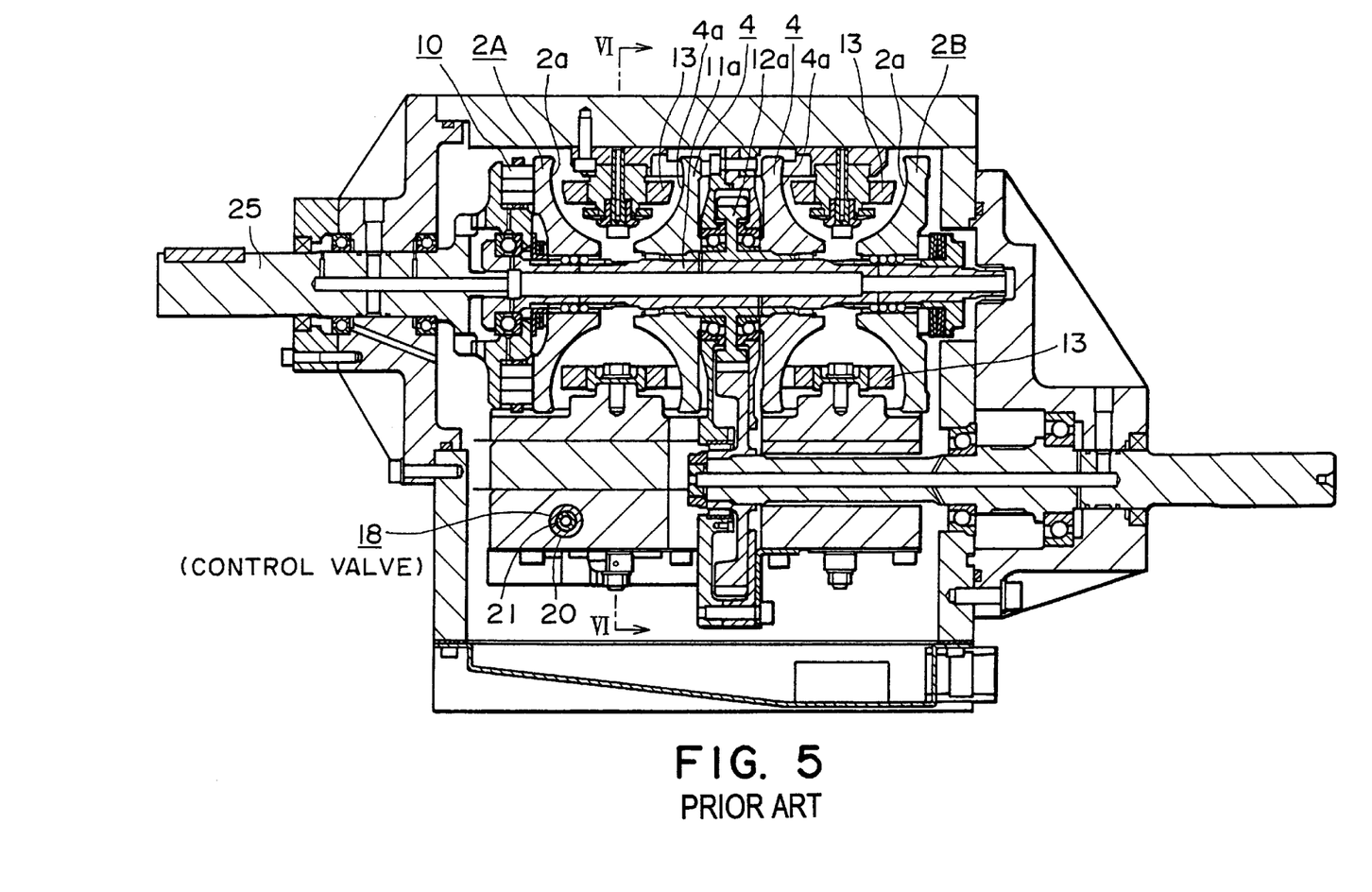
FIG. 5 is a partial sectional view showing a second example of a specific construction of the toroidal type continuously variable transmission.

Further, it is already known to provide a so-called double cavity type structure in which two input side discs 2A, 2B and two output side discs 4 are provided around an input shaft 11a and these input side discs 2A, 2B and output side discs 4 are disposed in parallel with respect to a power transmitting direction, as in the structure of FIGS. 5 and 6. In the structure shown in FIGS. 5 and 6, and output gear 12a is supported on an intermediate portion of the input shaft 11a for rotational movement around the input shaft 11a, and the output side discs 4 are spline-connected to both cylindrical ends provided at a center of the output gear 12a. Further, the input side discs 2A, 2B are supported by both ends of the input shaft 11a for rotation together with the input shaft 11a. The input shaft 11a is rotated by a drive shaft 25 via an urging device 10 of loading cam type.

In case of the above-mentioned toroidal type continuously variable transmission of double cavity type, since transmission of power from the input shaft 11a to the output gear 12a is effected through two systems between the input side disc 2A and one output side disc 4 and between the input side disc 2B and the other output side disc 4, great power can be transmitted. Also, in case of such toroidal type continuously variable transmission of double cavity type, when the speed change is effected, the trunnions 7 are displaced by the hydraulic actuators 17 in the axial directions of the pivot shafts 6. As mentioned above, the single control valve 18 for controlling the supplying/discharging of the pressurized oil with respect to the actuators 17 for speed change is provided for the plurality of actuators 17. Further, in case of the above-mentioned toroidal type continuously variable transmission of double cavity type, in addition to the fact that a synchro-cable 27 is mounted between the trunnions 7 in the same cavity with cross belting, another synchro-cable (not shown) is mounted between the trunnions 7 in different cavities so that inclined angles of all of the trunnions can be synchronized mechanically.

In the above-mentioned conventional toroidal type continuously variable transmissions, when the speed changing operation is quickly effected under the high speed condition, the displaced conditions of the trunnions 7 are not always synchronized sufficiently, with the result that the operation may be made unstable in the transition of the speed change. The reason is that the supplying/discharging of the pressurized oil with respect to the actuators 17 for the respective trunnions 7 is switched by the single control valve 18. More specifically, when the supplying/discharging of the pressurized oil with respect to the actuators 17 is switched by the single control valve 18, the forces (thrust forces along the axial directions of the pivot shafts 6) generated by the actuators 17 become the same, but, the displaced amounts of the trunnions 7 obtained by the actuators are not always the same. For example, although both ends of the trunnions 7 are supported with respect to the support plates 13 by radial needle bearings 26 for axial and rocking movements, it is very difficult to make resistances of the radial needle bearings 26 completely uniform. Further, difference in resistance may occur in the actuators 17 and/or other parts. Since such difference in resistance is small, in a normal condition, there is almost no problem; however, when the speed change is quickly switched, such difference becomes noticeable, and, thus, the difference in displaced amount between the trunnions 7 is significant. As a result, the abutment positions between the peripheral surfaces of the power rollers 9 for the respective trunnions 7 and the inner surfaces 2a, 4a of the input and output side discs 2A, 2B, and 4 are dispersed with respect to the diametrical direction. In such a condition, excessive slip occurs on the abutment portions between the surfaces 9a and 2a, 4a, thereby not only reducing the transmitting efficiency of the toroidal type continuously variable transmission but also reducing the rolling contact fatigue lives of the surfaces 9a, 2a, 4a.

Since such a problem becomes noticeable particularly when the speed change is effected quickly under the high speed operation, when the toroidal type continuously variable transmission is developed as a transmission for high performance vehicles such as sports cars, such a problem should be solved.

The synchro-cables (synchro-cable 27 and synchro-cable (not shown)) have a function for synchronizing the inclined angles of all of the trunnions 7. However, since such synchro-cables have slight looseness in consideration of the assembling error, it is difficult to coincide the inclined angles of the trunnions with each other completely, with the result that the speed changing operation cannot always be stabilized.

As a technique for coinciding the displaced amounts of the trunnions with each other, a technique disclosed in Japanese Patent No. 2568684 is already known, as well as the synchro-cables. According to this technique, in a toroidal type continuously variable transmission of double cavity type as shown in FIG. 5, support plates for supporting trunnions in respective cavities are interconnected so that displaced amounts of the trunnions are coincided with each other. However, in such a conventional technique, the displaced amounts of the trunnions cannot be coincided with each other adequately. Specifically, since the trunnions are very sensitive so as to start their displacing movements (rocking displacements around the pivot shafts) even when they are shifted in the axial directions of the pivot shafts only by about 0.1 mm, the above problem cannot be solved adequately by the above-mentioned mechanical interconnection.

Further, Japanese Patent Application Laid-Open No. 5-39850 discloses a technique in which stability in the speed change operation is maintained by regulating amounts of displacements of trunnions fed-back to a control valve. However, the displaced amounts of the trunnions cannot be coincided with each other regardless of difference in resistance between the displacements of the trunnions.

SUMMARY OF THE INVENTION

The present invention aims to eliminate the above-mentioned conventional drawbacks and provides a toroidal type continuously variable transmission in which displaced amounts of the trunnions can be coincided with each other, regardless of difference in resistance between displacements of trunnions.

Similar to the conventional toroidal type continuously variable transmission, a toroidal type continuously variable transmission according to the present invention comprises first and second discs disposed coaxially with each other and rotatably supported in a condition that inner surfaces thereof are opposed to each other, a plurality of trunnions rocked around pivot shafts located at positions twisted with respect to central axes of the first and second discs, displacement shafts protruded from and supported by inner surfaces of the trunnions at intermediate portions thereof, power rollers disposed toward the inner surfaces of the trunnions and rotatably supported around the displacement shafts while being pinched between the first and second discs, hydraulic actuators provided for the respective trunnions and adapted to rock the trunnions around the pivot shafts by displacing the trunnions in axial directions of the pivot shafts thereby to change a speed change ratio between the first (input side) disc and the second (output side) disc, a control valve for switching supplying/discharging of pressurized oil with respect to the trunnions, and a feedback mechanism provided on either one of the trunnions and adapted to transmit movement of the trunnion to the control valve to switch a supplying/discharging condition of the control valve.

The inner surfaces of the first and second discs are concave surfaces having arc sections, and peripheral surfaces of the power rollers are spherical convex surfaces, and the peripheral surfaces abut against the inner surfaces of the discs.

Particularly, in the toroidal type continuously variable transmission according to the present invention, a relationship bet n the switching of the control valve and the displacements of the trunnions has fast/slow difference. The initiation of the displacement of the trunnion having the feedback mechanism is effected more sensitively than the initiation of the displacement of the trunnion not having the feedback mechanism.

According to the toroidal type continuously variable transmission of the present invention having the above-mentioned arrangement, when inclined angles of the trunnions around the pivot shafts are changed to change the speed change ratio, the trunnion having the feedback mechanism tends to be displaced prior to the displacement of the trunnion not having the feedback mechanism. As a result, even when the quick speed changing operation is effected by displacing the trunnions smoothly, the operation does not become unstable. The reason will be explained hereinbelow.

As is in the conventional arrangement, when a relationship between the switching of the control valve and the displacements of the trunnions does not have fast/slow difference, in accordance with error inevitable for manufacturing, the initiation of the displacement of the trunnion not having the feedback mechanism may become faster than the initiation of the displacement of the trunnion having the feedback mechanism. In such a case, the displacement of the trunnion not having the feedback mechanism cannot be braked, with the result that the trunnion not having the feedback mechanism tends to run away, thereby making the operation unstable as mentioned above.

Particularly, in such a case, while the trunnion having the feedback mechanism is being displaced by a predetermined amount to close the control valve, the actuator for displacing the trunnion not having the feedback mechanism continues to output the force. Thus, even when a synchronizing mechanism for mechanically coinciding the inclined angles of the trunnions with each other is provided between the trunnions, the trunnion not having the feedback mechanism will be excessively displaced while elastically deforming structural elements of the synchronizing mechanism. In other words, the excessive displacement of the trunnion not having the feedback mechanism cannot be braked, with the result that the instability of the operation is apt to become great. Incidentally, if the trunnion having the feedback mechanism is displaced by the synchronizing mechanism, since the control valve is closed in a condition that this trunnion is displaced by the predetermined amount and this trunnion is not further displaced, there occurs difference in displacement amount between this trunnion and the trunnion not having the feedback mechanism which was excessively displaced. Such difference may be a factor for making the transient operation unstable.

To the contrary, in case of the present invention, the initiation of the displacement of the trunnion having the feedback mechanism is effected prior to the initiation of the displacement of the trunnion not having the feedback mechanism. And, the movement of this trunnion is transmitted to the control valve via the feedback mechanism, with the result that the control valve is closed in the condition that this trunnion is displaced by the predetermined amount, thereby stopping the supplying/discharging of the pressurized oil with respect to the actuators for all of the trunnions. Accordingly, both the trunnion having the feedback mechanism and the trunnion not having the feedback mechanism are not displaced excessively.

It should be noted that delay in displacement of the trunnion not having the feedback mechanism is not a problem, even if the delay becomes great. In such a case, by the synchronizing mechanism (such as the aforementioned synchro-cables or transmitting gear mechanism) for mechanically synchronizing the inclined angles of all of the trunnions, the movement of the trunnion having the feedback mechanism is transmitted to the trunnion not having the feedback mechanism to coincide the inclined angles of all of the trunnions with each other. The trunnion not having the feedback mechanism is not resisted by the actuator associated with this trunnion and is easily displaced by the synchronizing mechanism. Accordingly, the inclined angles of the trunnions can be coincided with each other smoothly. Incidentally, the operation for ultimately coinciding the inclined angles of all of the trunnions exactly is effected by rocking the pivot shafts provided on both ends of the trunnions relative to the respective support plates and by displacing the support plates within the casing.

As mentioned above, even if the delay in displacement of the trunnion not having the feedback mechanism becomes great, the degree of the delay is limited, and such delay can be corrected smoothly by the synchronizing mechanism.

Thus, even when the quick speed changing operation is effected, the operation can be stabilized, and remarkable slip can be prevented from generating at traction portions (abutment portions) between the inner surfaces of the discs and the peripheral surfaces of the rollers, thereby maintaining the efficiency and improving service lives of the discs and the power rollers.

DETAILED DESCRIPTION OF THE PREFERRED EMBODIMENTS

A toroidal type continuously variable transmission according to the present invention is characterized in that displacement of a trunnion 7 having a feedback mechanism including a precess cam 23 and a link arm 24 for stabilizing a speed changing operation (for changing a speed change ratio) is effected prior to displacement of another trunnion 7 not having such a feedback mechanism. Since the constructions of other parts illustrated in the drawings and functions for transmitting power between an input portion and an output portion and for changing the speed change ratio between the input portion and the output portion are the same as the conventional toroidal type continuously variable transmission shown in FIGS. 3 and 4 or FIGS. 5 and 6, explanation of the similar or equivalent parts will be omitted.

Figure 9:
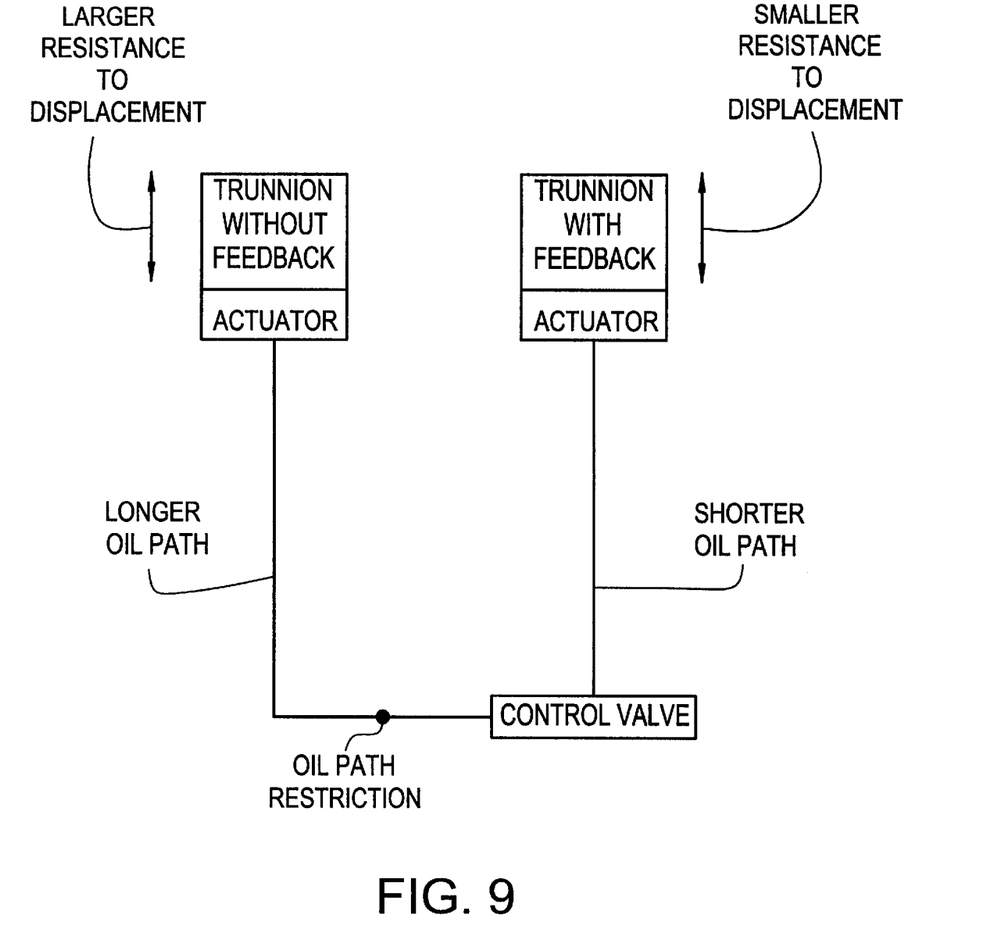
FIG. 9 is a block diagram showing exemplary techniques which may be employed to implement the present invention.

Incidentally, as means for establishing the switching of the control valve 18 and the displacement of the trunnions 7 having fast/slow difference, and for establishing the initiation of the displacement of the trunnion having the feedback mechanism with more sensitivity than the initiation of the displacement of the trunnion not having the feedback mechanism, for example, means (1) to (4) are considered. When the actual toroidal type continuously variable transmission is constructed, one or more means selected among the means (1) to (4) is(are) incorporated into the toroidal type continuously variable transmission as shown diagrammatically in FIG. 9.

(1) A length of an oil path from the control valve 18 to the actuator 17 for displacing the trunnion 7 having the feedback mechanism is selected to be smaller than a length of an oil path from the control valve 18 to the actuator 17 for displacing the trunnion 7 not having the feedback mechanism.

(2) A restriction is provided on the way of the oil path from the control valve 18 to the actuator 17 for displacing the trunnion 7 not having the feedback mechanism.

(3) Resistance against the displacement of the trunnion 7 having the feedback mechanism is selected to be smaller than resistance against the displacement of the trunnion 7 not having the feedback mechanism. To this end, for example, tightening forces of seal rings slidingly contacted with a rod 22 connected to the ends of the trunnions 7 are weakened (but not enough to cause oil leakage), thereby facilitating the movement of the rod.

(4) Resistance against the displacement of the trunnion 7 not having the feedback mechanism is provided on this trunnion 7. Such resistance may be a damper having viscosity resistance.

Next, results of tests effected to ascertain the effect of the invention will be explained. The tests were performed by using the toroidal type continuously variable transmission of double cavity type as shown in FIGS. 5 and 6. A displaced amount of the trunnion 7 having the feedback mechanism (left in FIG. 6) and a displaced amount of the trunnion 7 not having the feedback mechanism (right in FIG. 6) were measured, as well as displaced amounts of the sleeve 20 and the spool 21 of the control valve 18.

Figure 7A:
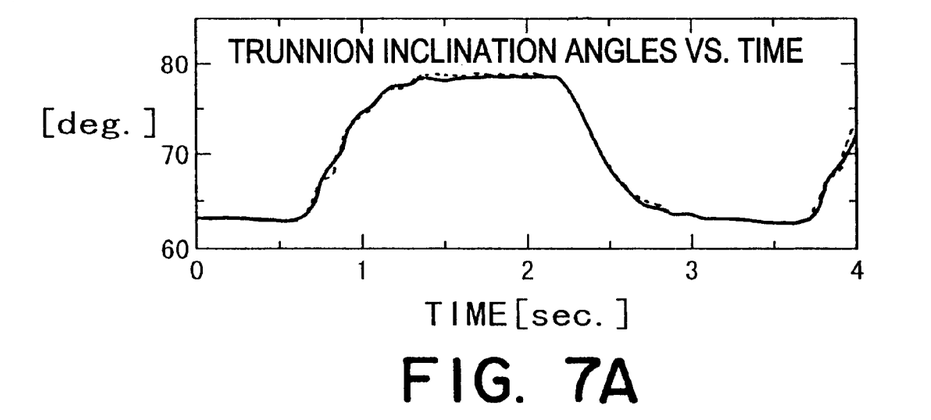
FIGS. 7A, 7B and 7C are graphs showing displacement conditions of a trunnion, an actuator and a control valve in an arrangement different from the present invention.
Figure 7B:
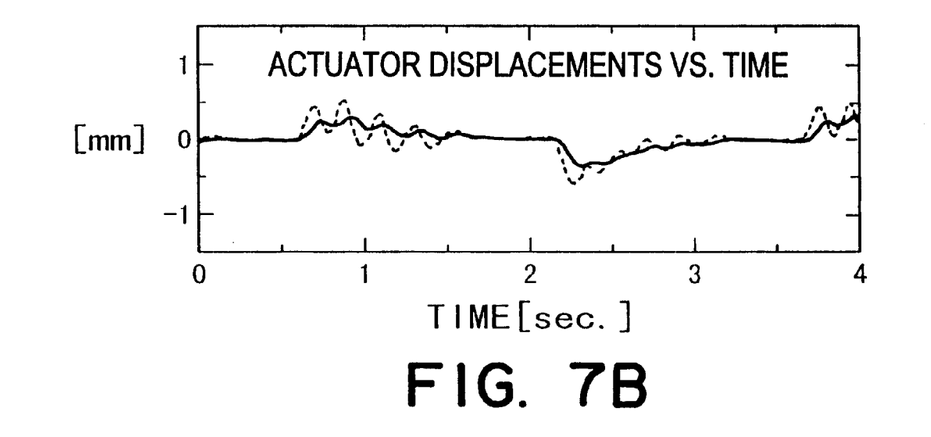
Figure 7C:
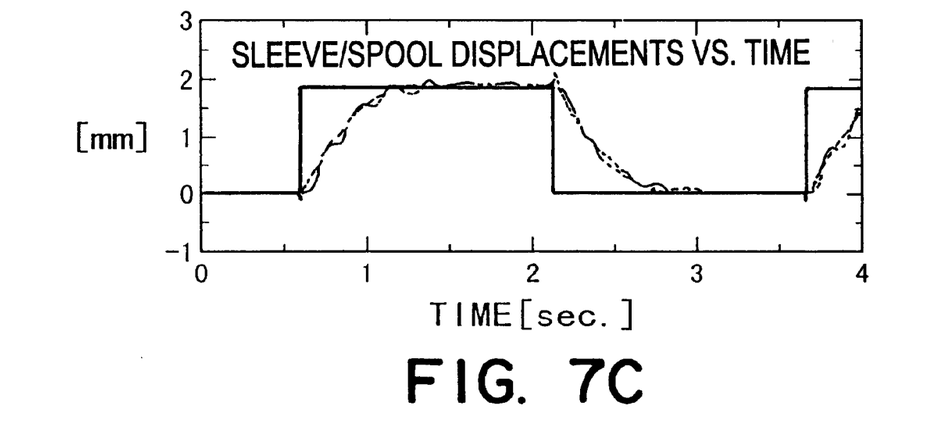

First of all, a structure (opposed to the present invention) in which the resistance against the displacement of the trunnion 7 having the feedback mechanism (left in FIG. 6) is greater than the resistance against the displacement of the trunnion 7 not having the feedback mechanism (right in FIG. 6) was manufactured and the above-mentioned displaced amounts were measured. Results are shown in FIGS. 7A to 7C. FIG. 7A shows the inclined angles of the trunnions 7. Particularly, the solid line indicates the inclined angle of the trunnion 7 having the feedback mechanism (left in FIG. 6) and the broken line indicates the inclined angle of the trunnion 7 not having the feedback mechanism (right in FIG. 6).

Further, FIG. 7B indicates the displaced amounts of the actuators for displacing the trunnions. Particularly, the solid line indicates the displaced amount of the actuator 17 for displacing the trunnion 7 having the feedback mechanism (left in FIG. 6) and the broken line indicates the displaced amount of the actuator 17 for displacing the trunnion 7 not having the feedback mechanism (right in FIG. 6).

Further, FIG. 7C indicates the displaced amounts of the sleeve 20 and the spool 21 constituting the control valve 18. Particularly, the solid line in FIG. 7C indicates target positions of the sleeve 20 and the spool 21 (value of a command signal for the control valve 18), the broken line indicates a position of the sleeve 20, and the dot and chain line indicates the position of the spool 21.

As apparent from FIGS. 7A to 7C showing the measurement results, if the resistance against the displacement of the trunnion 7 having the feedback mechanism is greater than the resistance against the displacement of the trunnion 7 not having the feedback mechanism, the speed changing operation becomes unstable.

Figure 8A:
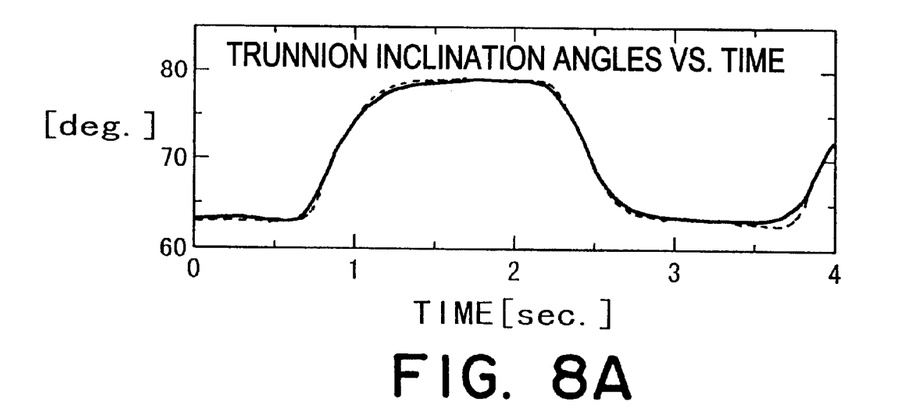
FIGS. 8A, 8B and 8C are graphs showing displacement conditions of a trunnion, an actuator and a control valve in an arrangement according to the present invention.
Figure 8B:
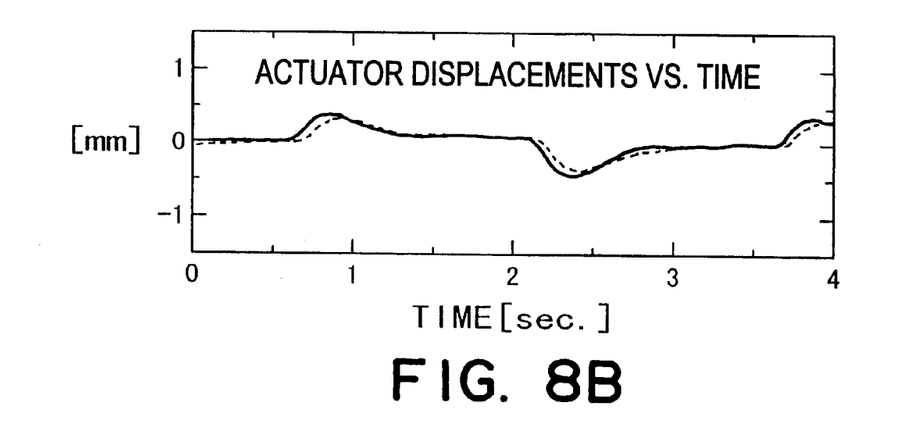
Figure 8C:
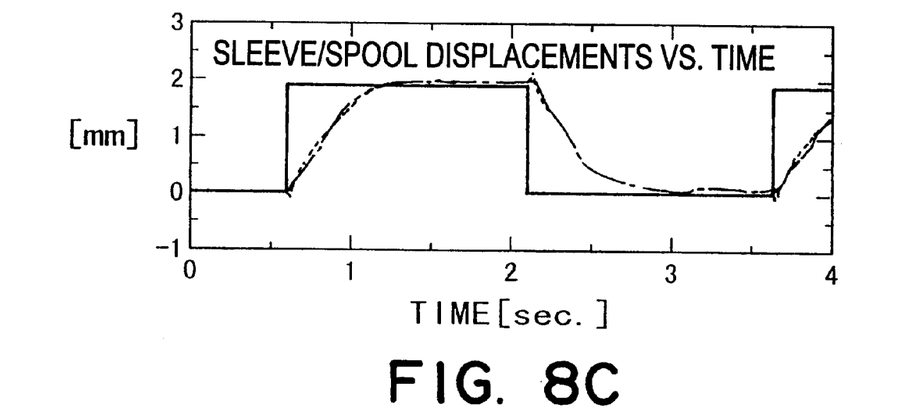

On the other hand, FIGS. 8A to 8C show the corresponding measured results obtained for the toroidal type continuously variable transmission according to the present invention, in which the resistance against the displacement of the trunnion 7 having the feedback mechanism (left in FIG. 6) is smaller than the resistance against the displacement of the trunnion 7 not having the feedback mechanism (right in FIG. 6).

As apparent from a comparison of FIGS. 8A to 8C and FIGS. 7A to 7C, according to the present invention, the speed changing operation can be stabilized.

Since the present invention has the above-mentioned arrangement, a toroidal type continuously variable transmission having excellent efficiency and good durability can be realized.

What is claimed is:

1. A toroidal continuously variable transmission, comprising:
    first and second discs disposed coaxially with each other and rotatably supported in a condition that inner surfaces thereof are opposed to each other;
    a plurality of trunnions rocked around pivot shafts located at positions twisted with respect to central axes of said first and second discs;
    displacement shafts protruded from and supported by inner surfaces of said trunnions at intermediate portions thereof;
    power rollers disposed toward the inner surfaces of said trunnions and rotatably supported around said displacement shafts while being pinched between said first and second discs;
    hydraulic actuators provided for the respective trunnions and adapted to rock said trunnions around said pivot shafts by displacing said trunnions in axial directions of said pivot shafts thereby to change a speed change ratio between said first disc and said second disc;
    a control valve for switching supplying/discharging of pressurized oil with respect to said trunnions; and
    a feedback mechanism provided for a first of said trunnions and adapted to transmit movement of said first trunnion having said feedback mechanism to said control valve to switch a supplying/discharging condition of said control valve; and
    wherein the inner surfaces of said first and second discs are concave surfaces having arcuate sections, and peripheral surfaces of said power rollers are spherical convex surfaces, and said peripheral surfaces abut against the inner surfaces of said discs; and
    further wherein a relationship between the switching of said control valve and the displacements of said trunnions is such that initiation of the displacement of said first trunnion having said feedback mechanism is effected prior to initiation of the displacement of a second trunnion not having said feedback mechanism.

2. A toroidal continuously variable transmission according to claim 1, wherein a synchronizing mechanism mechanically synchronizing inclined angles of said trunnions is provided between said trunnions.

3. A toroidal continuously variable transmission according to claim 1, wherein means for establishing the relationship between the switching of said control valve and the displacements of said trunnions are selected from the following means (1) to (4):
    (1) a length of an oil path from said control valve to the actuator for displacing said first trunnion having said feedback mechanism is selected to be smaller than a length of an oil path from said control valve to the actuator for displacing said second trunnion not having said feedback mechanism;
    (2) a restriction is provided along an oil path from said control valve to said actuator for displacing said second trunnion not having said feedback mechanism;
    (3) resistance against the displacement of said first trunnion having said feedback mechanism is selected to be smaller than resistance against the displacement of said second trunnion not having said feedback mechanism; and
    (4) resistance against the displacement of said second trunnion not having said feedback mechanism is provided on said second trunnion.

4. A toroidal continuously variable transmission comprising:
    first and second discs disposed coaxially with each other and rotatably supported in a condition that inner surfaces thereof are opposed to each other;
    a plurality of trunnions rocked around pivot shafts located at positions twisted with respect to central axes of said first and second discs;
    displacement shafts protruded from and supported by inner surfaces of said trunnions at intermediate portions thereof;
    power rollers disposed toward the inner surfaces of said trunnions and rotatably supported around said displacement shafts while being pinched between said first and second discs;
    hydraulic actuators provided for the respective trunnions and adapted to rock said trunnions around said pivot shafts by displacing said trunnions in axial directions of said pivot shafts thereby to change a speed change ratio between said first disc and said second disc;
    a control valve for switching supplying/discharging of pressurized oil with respect to said trunnions; and
    a feedback mechanism provided for a first of said trunnions and adapted to transmit movement of said first trunnion having said feedback mechanism to said control valve to switch a supplying/discharging condition of said control valve; and
    wherein the inner surfaces of said first and second discs are concave surfaces having arcuate sections, and peripheral surfaces of said power rollers are spherical convex surfaces, and said peripheral surfaces abut against the inner surfaces of said discs; and further wherein said first trunnion having said feedback mechanism is displaced prior to a second trunnion not having said feedback mechanism when inclined angles of the trunnions with respect to the pivot shafts are changed in order to change the speed change ratio.

5. A toroidal continuously variable transmission according to claim 4, wherein a synchronizing mechanism mechanically synchronizing inclined angles of said trunnions is provided between said trunnions.

6. A toroidal continuously variable transmission according to claim 4, wherein a length of an oil path from said control valve to the actuator for displacing said first trunnion having said feedback mechanism is selected to be smaller than a length of an oil path from said control valve to the actuator for displacing said second trunnion not having said feedback mechanism.

7. A toroidal continuously variable transmission according to claim 4, wherein a restriction is provided along an oil path from said control valve to said actuator for displacing said second trunnion not having said feedback mechanism.

8. A toroidal continuously variable transmission according to claim 7, wherein a synchronizing mechanism mechanically synchronizing inclined angles of said trunnions is provided between said trunnions.

9. A toroidal continuously variable transmission according to claim 4, wherein resistance against the displacement of said first trunnion having said feedback mechanism is selected to be smaller than resistance against the displacement of said second trunnion not having said feedback mechanism.

10. A toroidal continuously variable transmission according to claim 4, wherein resistance against the displacement of said second trunnion not having said feedback mechanism is provided on said second trunnion.

11. A toroidal continuously variable transmission according to claim 4, wherein a length of an oil path from said control valve to the actuator for displacing said first trunnion having said feedback mechanism is selected to be smaller than a length of an oil path from said control valve to the actuator for displacing said second trunnion not having said feedback mechanism, and a restriction is provided along an oil path from said control valve to said actuator for displacing said second trunnion not having said feedback mechanism.

12. A toroidal continuously variable transmission according to claim 4, wherein a length of an oil path from said control valve to the actuator for displacing said first trunnion having said feedback mechanism is selected to be smaller than a length of an oil path from said control valve to the actuator for displacing said second trunnion not having said feedback mechanism, and resistance against the displacement of said first trunnion having said feedback mechanism is selected to be smaller than resistance against the displacement of said second trunnion not having said feedback mechanism.

13. A toroidal continuously variable transmission according to claim 4, wherein a length of an oil path from said control valve to the actuator for displacing said first trunnion having said feedback mechanism is selected to be smaller than a length of an oil path from said control valve to the actuator for displacing said second trunnion not having said feedback mechanism, and resistance against the displacement of said second trunnion not having said feedback mechanism is provided on said second trunnion.

14. A toroidal continuously variable transmission according to claim 4, wherein a length of an oil path from said control valve to the actuator for displacing said first trunnion having said feedback mechanism is selected to be smaller than a length of an oil path from said control valve to the actuator for displacing said second trunnion not having said feedback mechanism, a restriction is provided along an oil path from said control valve to said actuator for displacing said second trunnion not having said feedback mechanism, and resistance against the displacement of said first trunnion having said feedback mechanism is selected to be smaller than resistance against the displacement of said second trunnion not having said feedback mechanism.

15. A toroidal continuously variable transmission according to claim 4, wherein a length of an oil path from said control valve to the actuator for displacing said first trunnion having said feedback mechanism is selected to be smaller than a length of an oil path from said control valve to the actuator for displacing said second trunnion not having said feedback mechanism, a restriction is provided along an oil path from said control valve to said actuator for displacing said second trunnion not having said feedback mechanism, resistance against the displacement of said first trunnion having said feedback mechanism is selected to be smaller than resistance against the displacement of said second trunnion not having said feedback mechanism, and resistance against the displacement of said second trunnion not having said feedback mechanism is provided on said second trunnion.

16. A toroidal continuously variable transmission according to claim 14, wherein a synchronizing mechanism mechanically synchronizing inclined angles of said trunnions is provided between said trunnions.

17. A toroidal continuously variable transmission according to claim 4, wherein a restriction is provided along an oil path from said control valve to said actuator for displacing said second trunnion not having said feedback mechanism, and resistance against the displacement of said first trunnion having said feedback mechanism is selected to be smaller than resistance against the displacement of said second trunnion not having said feedback mechanism.

18. A toroidal continuously variable transmission according to claim 4, wherein a restriction is provided along an oil path from said control valve to said actuator for displacing said second trunnion not having said feedback mechanism, and resistance against the displacement of said second trunnion not having said feedback mechanism is provided on said second trunnion.

19. A toroidal continuously variable transmission according to claim 4, wherein a restriction is provided along an oil path from said control valve to said actuator for displacing said second trunnion not having said feedback mechanism, resistance against the displacement of said first trunnion having said feedback mechanism is selected to be smaller than resistance against the displacement of said second trunnion not having said feedback mechanism, and resistance against the displacement of said second trunnion not having said feedback mechanism is provided on said second trunnion.

20. A toroidal continuously variable transmission according to claim 4, wherein resistance against the displacement of said first trunnion having said feedback mechanism is selected to be smaller than resistance against the displacement of said second trunnion not having said feedback mechanism, and resistance against the displacement of said second trunnion not having said feedback mechanism is provided on said second trunnion.

21. A toroidal continuously variable transmission, comprising:
   first and second rotatable discs having opposed surfaces;
   a plurality of power rollers, including a first power roller and a second power roller disposed between said opposed surfaces of said first and second discs and rollingly engaged with said opposed surfaces to transmit rotation between said first and second discs, said first and second power rollers being mounted to respective displacement shafts supported by corresponding trunnions which are rockable around respective pivot axes to change inclination angles of said first and second power rollers relative to said first and second discs and thereby change a rotation transmission ratio between said first and second discs; and
   a trunnion displacement control system including hydraulic actuators, operative to axially displace said first and second trunnions to control the rocking movement of said first and second trunnions, and a feedback mechanism which feeds back movement of said first trunnion, but not said second trunnion, to a hydraulic control portion of said trunnion displacement control system;
   wherein said trunnion displacement control system is constructed to initiate axial displacement of said first trunnion before said second trunnion when changing the rotation transmission ratio.

22. A toroidal continuously variable transmission according to claim 21, wherein said control portion includes a hydraulic control valve coupled to said feedback mechanism.

23. A toroidal continuously variable transmission according to claim 22, further comprising a synchronizing mechanism coupled with said first and second trunnions and operative to mechanically synchronize inclination angles thereof.

24. A toroidal continuously variable transmission according to claim 22, wherein an oil path from said control valve to an actuator that displaces said first trunnion is shorter than an oil path form said control valve to an actuator that displaces said second actuator.

25. A toroidal continuously variable transmission according to claim 21, further comprising a synchronizing mechanism coupled with said first and second trunnions and operative to mechanically synchronize inclination angles thereof.

26. A toroidal continuously variable transmission according to claim 21, wherein said trunnion control system is constructed to provide greater resistance to displacement for said second trunnion than for said first trunnion.

27. A toroidal continuously variable transmission according to claim 21, wherein an oil path to an actuator that displaces the second trunnion includes a restriction tending to delay a start of displacement of said second trunnion relative to a start of displacement of said first trunnion.

* * * * *